US010051462B2

(12) United States Patent
Gupta et al.

(10) Patent No.: US 10,051,462 B2
(45) Date of Patent: Aug. 14, 2018

(54) HYBRID TRANSPORT FOR INSTALLED SERVICE UPDATES

(71) Applicant: T-Mobile USA, Inc., Bellevue, WA (US)

(72) Inventors: Puja Gupta, Redmond, WA (US); Joshua Finger, Covington, WA (US); Isaac Robinson, Bellevue, WA (US); Boris Antsev, Bothell, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 0 days.

(21) Appl. No.: 15/382,318

(22) Filed: Dec. 16, 2016

(65) Prior Publication Data

US 2018/0176769 A1 Jun. 21, 2018

(51) Int. Cl.
*H04W 4/06* (2009.01)
*H04W 8/24* (2009.01)
*H04W 8/22* (2009.01)
*H04W 12/06* (2009.01)
*H04W 76/02* (2009.01)
*G06F 8/65* (2018.01)
*H04W 76/10* (2018.01)

(52) U.S. Cl.
CPC .............. *H04W 8/22* (2013.01); *G06F 8/65* (2013.01); *H04W 4/06* (2013.01); *H04W 12/06* (2013.01); *H04W 76/02* (2013.01); *H04W 76/10* (2018.02)

(58) Field of Classification Search
CPC ......... H04W 8/22; H04W 4/06; H04W 12/06; H04W 76/02; G06F 8/65; G06F 8/65
USPC ....................................................... 455/419
See application file for complete search history.

(56) References Cited

U.S. PATENT DOCUMENTS

| 6,640,334 B1 * | 10/2003 | Rasmussen | G06F 8/65 717/169 |
| 7,668,612 B1 * | 2/2010 | Okkonen | G06F 8/65 700/95 |
| 8,898,748 B2 * | 11/2014 | Burks | G06F 9/44505 709/221 |

(Continued)

FOREIGN PATENT DOCUMENTS

| KR | 1020090012652 | 2/2009 |
| KR | 1020140026734 | 3/2014 |

OTHER PUBLICATIONS

3GPP, "Universal Mobile Telecommunications System (UMTS); LTE; Multimedia Broadcast/Multicast Service (MBMS); Architecture and functional description (3GPP TS 23.246 version 9.5.0 Release 9)," Jun. 2010, 67 pages.

(Continued)

*Primary Examiner* — Nathan Taylor
(74) *Attorney, Agent, or Firm* — Lee & Hayes, PLLC (57) ABSTRACT

The systems, devices, and methods discussed herein are directed to a network for delivering to portable communication devices, or user equipment (UEs) subscribed to the network, an update for an install service, such as software and firmware, via a hybrid transport mechanism. The hybrid transport mechanism comprises initially broadcasting the update to multiple UEs simultaneously, then re-broadcasting, multicasting, multiple unicasting, and/or transmitting via a wireless local area network (WLAN), the update to a group of UEs that missed the initial broadcast and/or needing file repairs.

16 Claims, 9 Drawing Sheets

(56) References Cited

U.S. PATENT DOCUMENTS

| | | | |
|---|---|---|---|
| 2005/0055595 A1* | 3/2005 | Frazer | G06F 8/665 713/400 |
| 2005/0063409 A1* | 3/2005 | Oommen | H04L 12/1836 370/432 |
| 2006/0010437 A1* | 1/2006 | Marolia | G06F 8/65 717/168 |
| 2006/0126556 A1* | 6/2006 | Jiang | H04L 12/18 370/328 |
| 2006/0264206 A1* | 11/2006 | Itaba | H04W 8/245 455/414.3 |
| 2007/0118617 A1* | 5/2007 | Lee | G06F 8/65 709/219 |
| 2008/0242290 A1 | 10/2008 | Bhatia et al. | |
| 2009/0147718 A1* | 6/2009 | Liu | H04L 12/1863 370/312 |
| 2011/0191764 A1* | 8/2011 | Piorecki | G06F 8/65 717/172 |
| 2012/0084765 A1 | 4/2012 | Lee et al. | |
| 2012/0124570 A1* | 5/2012 | Alberth, Jr. | G06F 8/65 717/173 |
| 2012/0135719 A1* | 5/2012 | Haughn | G06F 8/65 455/414.1 |
| 2012/0158983 A1* | 6/2012 | Glasser | H04L 67/1008 709/230 |
| 2013/0173817 A1* | 7/2013 | Field | H04L 65/4076 709/231 |
| 2013/0188547 A1* | 7/2013 | Moriwaki | H04W 28/06 370/312 |
| 2013/0344798 A1 | 12/2013 | Walker et al. | |
| 2014/0068592 A1* | 3/2014 | Chitre | G06F 8/65 717/171 |
| 2014/0198702 A1* | 7/2014 | Lin | H04W 4/06 370/312 |
| 2015/0271247 A1* | 9/2015 | Patsiokas | H04L 67/06 709/217 |
| 2017/0230804 A1* | 8/2017 | Weidenfeller | H04W 4/06 |

OTHER PUBLICATIONS

PCT Search Report and Written Opinion dated Mar. 16, 2018 for PCT Application No. PCT/US17/64496, 15 pages.

* cited by examiner

HYBRID TRANSPORT FOR INSTALLED SERVICE UPDATES

BACKGROUND

Modern telecommunication systems include heterogeneous mixtures of second, third, and fourth generation (2G, 3G, and 4G) cellular-wireless access technologies, which can be cross-compatible and can operate collectively to provide data communication services. Global Systems for Mobile (GSM) is an example of 2G telecommunications technologies; Universal Mobile Telecommunications System (UMTS) is an example of 3G telecommunications technologies; and Long Term Evolution (LTE), including LTE Advanced, and Evolved High-Speed Packet Access (HSPA+) are examples of 4G telecommunications technologies.

Mobile devices operating in such telecommunication systems may require software updates for receiving enhanced or additional features, for repairing software bugs, for staying fully compatible with the telecommunication systems updates, or for any other reason to improve the operation of mobile devices. To rollout software updates to mobile devices in the field, a unicast may be utilized for a given model of devices and/or for devices having a given version of software to be updated. However, to update via unicast, each device is allocated individual network resources, which may impact the network capacity considering there may be millions of devices to be updated.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

The systems, devices, and methods discussed herein are directed to a network for delivering to communication devices subscribed to the network an update for an install service and/or a desired or required file, such as software and firmware or a file from a service provider, via a hybrid transport mechanism. The communication devices may include mobile devices such as cellular phones, laptop/desktop/tablet computers, any connected devices such as Internet of Things (IoT) devices, and the like, which are herein interchangeably referred as user equipment (UEs). The hybrid transport mechanism comprises initially broadcasting the update to multiple UEs simultaneously, then re-broadcasting, multicasting, multiple unicasting, and/or transmitting via a wireless local area network (WLAN), the update to a group of UEs that missed the initial broadcast and/or needing file repairs. In contrast to the current software/firmware update mechanism where each UE receives the update from the network individually via unicast, with a hybrid transport mechanism utilizing broadcasting and unicasting, the network would only be impacted once, as opposed to potentially millions of times for delivery to millions of UEs individually, to deliver a single package to all relevant UEs via broadcast after an initial handshake authentication. The hybrid transport mechanism may fall back to unicast for the UEs that missed the broadcast opportunity to provide the update.

The hybrid transport mechanism allows a rapid deployment of time sensitive updates such as security based maintenance releases. Additionally, a specific spectrum may be allocated for broadcasting the service update.

Figure 1:
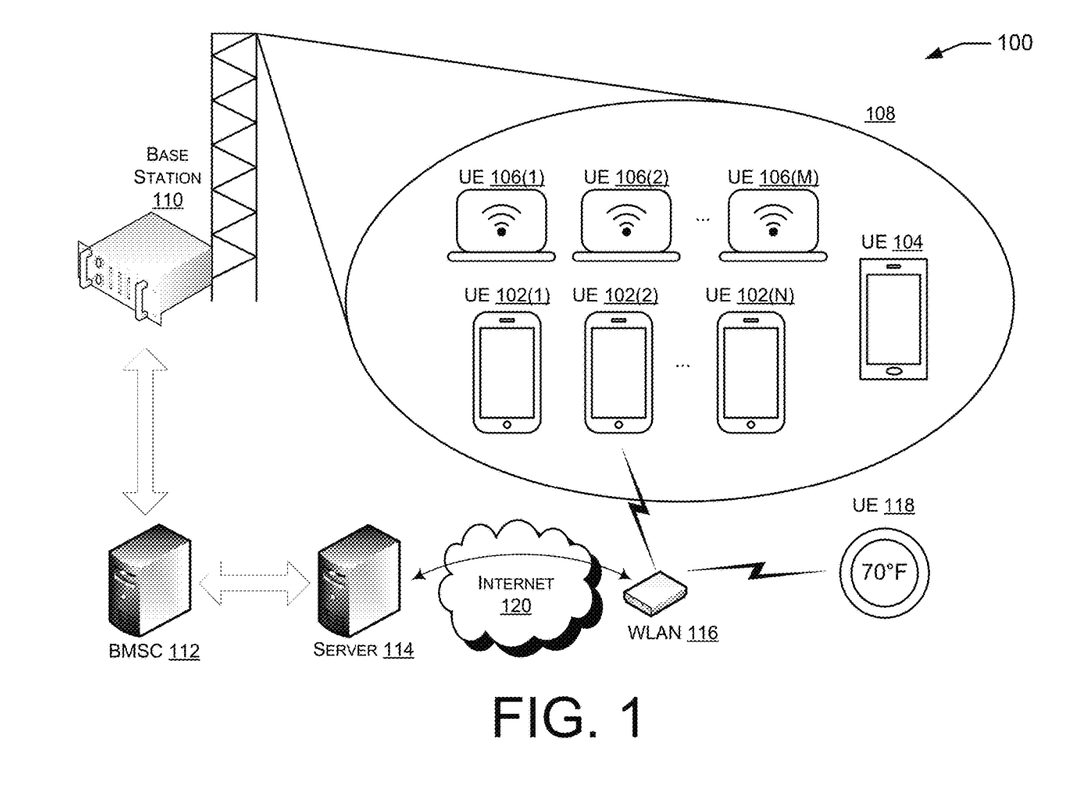
FIG. 1 illustrates an example environment in which a hybrid transport for installed service update may be practiced.

FIG. 1 illustrates an example environment 100 in which a hybrid transport for installed service update may be practiced.

User equipment (UE) 102, UE 104, and UE 106 may be mobile devices that are located within a broadcast coverage area 108 of a base station 110 for a service update. The UE 102 comprises N UEs of which three (102(1), 102(2), and 102(N)) are shown, and may represent a portable communication device such as a cellular telephone having an installed service that is compatible with the service update. The UE 104 may also be a cellular telephone but has an installed service that is not compatible with the service update. The UE 106 comprises M UEs of which three (106(1), 106(2), and 102(M)) are shown, and may represent a portable communication device such as a tablet or laptop computer having an installed service that is compatible with the service update.

A broadcast multicast service center (BMSC) 112 may be communicatively connected to the base station 110 and a server 114, such as a firmware over-the-air (FOTA) server, which contains the service update. The BMSC 112 may receive the service update from the server 114, and forward it to the base station 110 to be transmitted to the UEs 102 and 106. The BMSC 112 may also receive relevant information and data from the UEs 104 and 106 via the base station 110. Another UE 118, which is an IoT device illustrated as a thermostat, also has an installed service that is compatible with the service update, but is shown to be located outside of the broadcast coverage area 108. Some of the UEs, for example the mobile device UE 102(2) and the IoT device 118, as shown in FIG. 1, may also be able to connect to the server 114 via a wireless local area network (WLAN) 116, which is communicatively connected to the server 114 via Internet 120.

Figure 2:
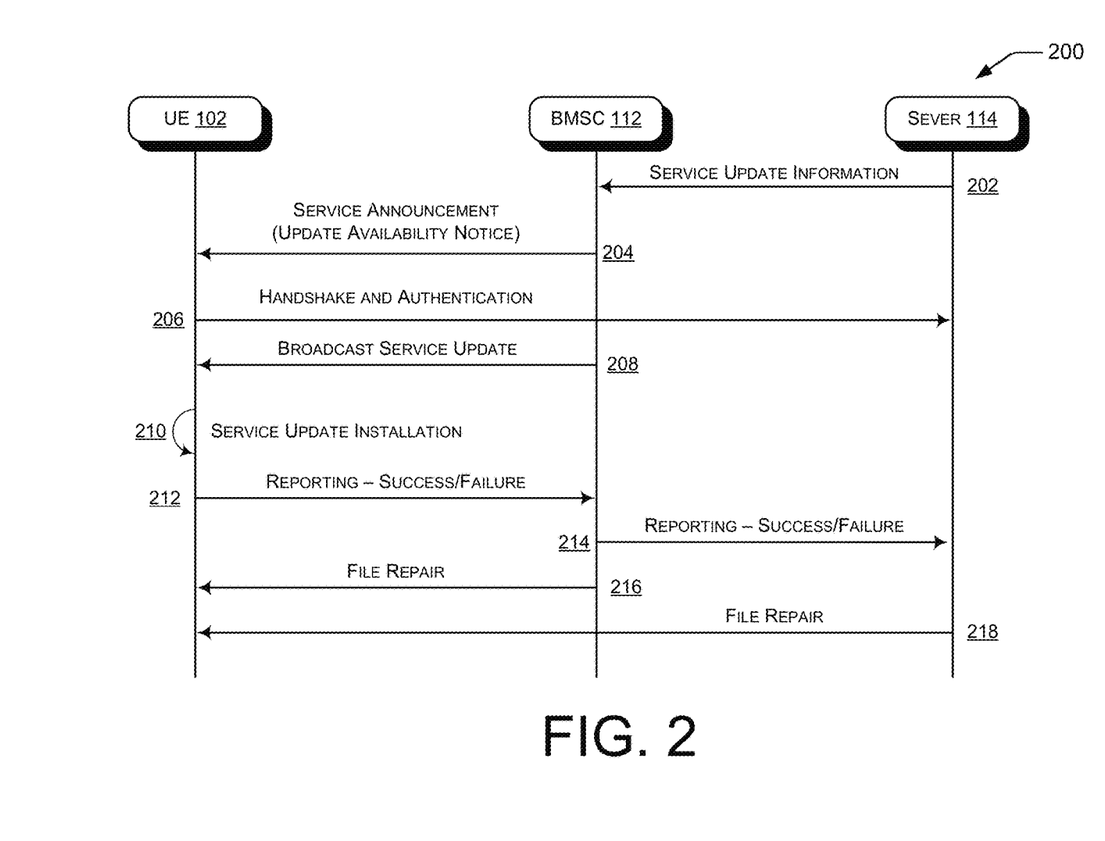
FIG. 2 illustrates an example sequence diagram of the hybrid transport for installed service update for a user equipment (UE).

FIG. 2 illustrates an example sequence diagram 200 of the hybrid transport for installed service update for UEs. The UE 102 is referenced in the description below as a representative of multiple UEs involved in the service update.

At 202, the server 114 may provide service update information, such as software or firmware update availability, a corresponding file, and/or a desired or required file from a service provider, to the BMSC 112. The service update information may be relevant to a certain model of UEs and/or UEs having a specific version of an installed service to be updated. At 204, the BMSC 112 may provide a service announcement regarding the service update availability. The service announcement may be made to the UE 102 in various ways, such as by broadcasting the announcement via the base station 110 to the UEs in the coverage area 108 as illustrated in FIG. 1 as the service update becomes available, and following up with periodic service announcement broadcasts such as once a day, and in transmitting the service announcement in response to an inquiry regarding the service update availability from the UE 102 upon powering up. The service announcement may include a scheduled broadcast time for the service update, for example, during off-peak hours or a maintenance window.

In response to the service announcement, the UE 102 may establish communication with the server 114 via the base station 110 and the BMSC 112 at 206, and authenticate with the server 114. As discussed above, the service update may only be applicable to a specific group of UEs, and not to other UEs as discussed with reference to UE 104 in FIG. 1, which does not have the installed service or a relevant version of the installed service, and does not respond to the service announcement. At 208, the BMSC 112 may broadcast the service update via the base station 110 to the UEs including the UE 102 in the coverage area 108. A dedicated broadcasting channel or spectrum may be used for broadcasting the service update to the UEs. At 210, the UE 102 may implement the service update, and send a report to the BMSC 112 notifying whether the service update was successfully implemented at 212. The UE 102 may fail to successfully implement the service update due to various conditions such as missing the service update broadcast, receiving the service update but failing to successfully implement the received service update, getting interrupted during the service update broadcast, and receiving a corrupt service update. At 214, the BMSC 112 may forward the report from the UE 102 to the server 114, and the server 114 may update the status of the UE 102.

If the report indicates that the UE 102 has not successfully implemented the service update, the server 114 may repair the unsuccessfully implemented service update or re-transmit the service update to the UE 102 from the BMSC 112 at 216 or from the server 114 at 218.

Figure 3:
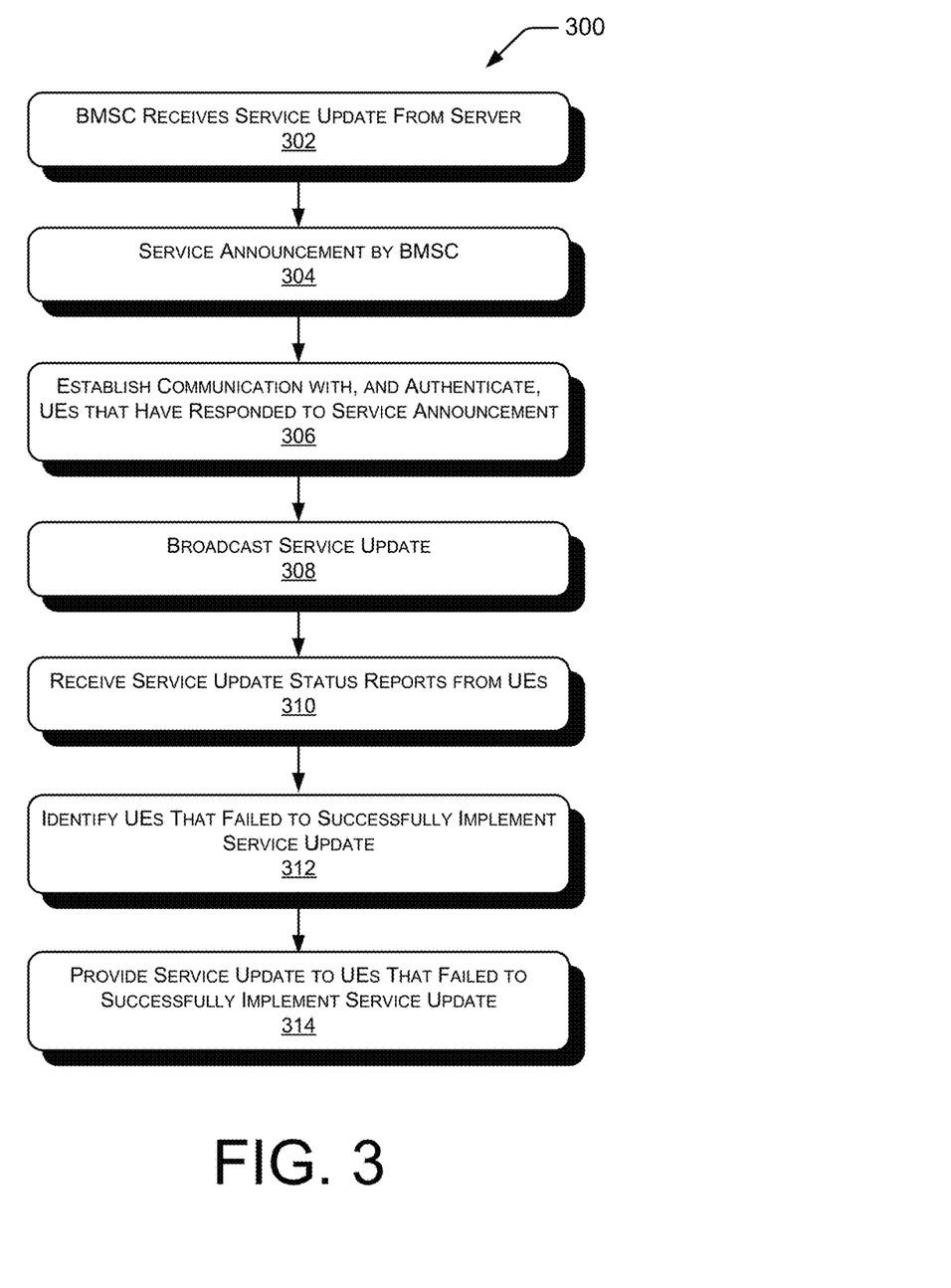
FIG. 3 illustrates an example process of the hybrid transport for installed service update for the UE.

FIG. 3 illustrates an example process 300 of the hybrid transport for installed service update for the UEs. The UE 102 is referenced in the description below as a representative of multiple UEs involved in the service update.

In block 302, the BMSC 112 may receive service update information, such as software or firmware update availability and a corresponding file, from the server 114 such as a FOTA server, and may provide a service announcement regarding the service update availability to the UEs, such as the UE 102, in block 304. The BMSC 112 may provide the service announcement by broadcasting the service announcement via the base station 110 to the UEs in the coverage area 108 as illustrated in FIG. 1 as the service update becomes available, and following up with periodic service announcements such as once a day, and transmitting the service announcement in response to an inquiry regarding the service update availability from a UE, such as the UE102, upon powering up. The service announcement may include a scheduled broadcast time for the service update, for example, during off-peak hours or a maintenance window.

In block 306, the server 114 may establish communication with, and authenticate, the UEs that have responded to the service announcement. In block 308, the BMSC 112 may then broadcast the service update via the base station 110 to the UEs which the server 114 has authenticated. A dedicated broadcasting channel or spectrum may be used for broadcasting the service update to the UEs. In block 310, the BMSC 112 may receive, from the UEs receiving the service update, reports indicating whether each UE associated with a report has successfully implemented the service update, and forward the reports to the server 114. Each report may also include a type of failure discussed above for the UE associated with the report. In block 312, the server 114 may identify the UEs that have failed to successfully implement the service update based on the reports, and in block 314, the server 114 may provide the service update to the identified UEs that have failed to successfully implement the service update.

The server 114 may provide the service update to the identified UEs in various ways. Some example processes of block 314 are as described below.

Figure 4:
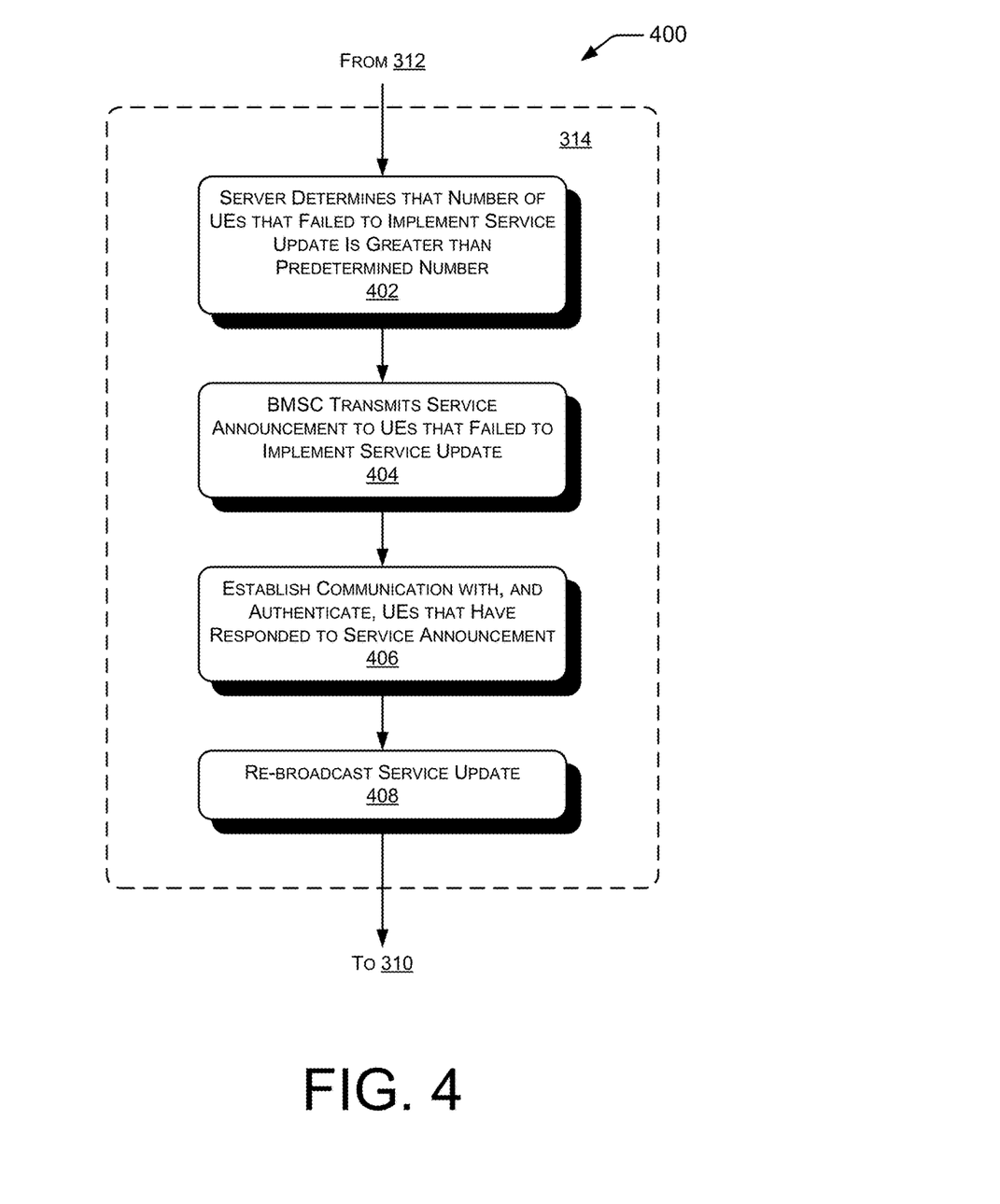
FIG. 4 illustrates a first example process detailing the block of FIG. 3 for providing the service update to the UEs that failed to successfully implement the service update.

FIG. 4 illustrates a first example process 400 detailing block 314 of FIG. 3 for providing the service update to the UEs that failed to successfully implement the service update. If a large number of the UEs were found to have failed to successfully implement the service update based on the reports, it may be more economical in time and network resources to re-broadcast the service update targeted to all the UEs that failed to successfully implement the service update.

In block 402, the server 114 may determine that a number of UEs that have failed to successfully implement the service update, based on the UEs identified in block 312, is greater than a predetermined number. The predetermined number may be, for example, a number corresponding to 50% of the UEs that have responded to the service announcement in block 306 discussed above. The server 114, in block 404, may then cause the BMSC 112 to transmit another service announcement to the UEs that have failed to successfully implement the service update. In block 406, the server 114 may establish communication with, and authenticate, the UEs that have responded to the other service announcement. In block 408, the BMSC 112 may then re-broadcast the service update via the base station 110 to those UEs authenticated by the server 114. The process may then go back to block 310 where the implementation status reports from the UEs are received, and the process may be repeated for a predetermined number of times.

Figure 5:
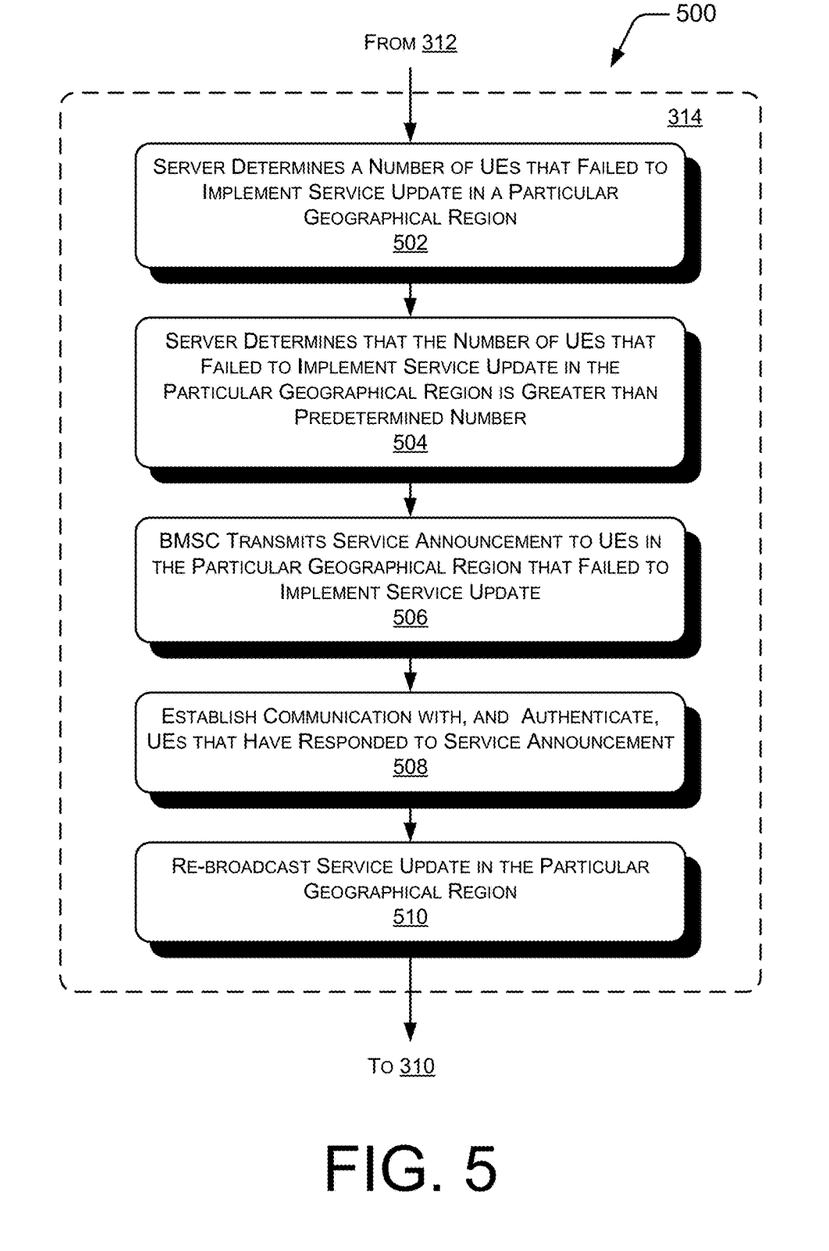
FIG. 5 illustrates a second example process detailing the block of FIG. 3 for providing the service update to the UEs that failed to successfully implement the service update.

FIG. 5 illustrates a second example process 500 detailing block 314 of FIG. 3 for providing the service update to the UEs that failed to successfully implement the service update. If a large number of the UEs in a particular geographical region were found to have failed to successfully implement the service update based on the reports, it may be more economical in time and network resources to regionally re-broadcast the service update targeted to all the UEs that failed to successfully implement the service update in the particular geographical region.

In block 502, the server 114 may determine a number of UEs that have failed to successfully implement the service update in a particular geographical region, based on the UEs identified in block 312. Upon determining that the number of UEs that have failed to successfully implement the service update in the particular geographical region is greater than a predetermined number in block 504, the server 114 may then cause the BMSC 112 to transmit another service announcement to the UEs in the particular geographical region that have failed to successfully implement the service update in block 506. In block 508, the server 114 may establish communication with, and authenticate, the UEs that have responded to the other service announcement. In block 510, the BMSC 112 may then re-broadcast the service update via a base station located in the particular geographical region to those UEs which the server 114 has authenticated. The process may then go back to block 310 where the implementation status reports from the UEs are received, and the process may be repeated for a predetermined number of times.

Figure 6:
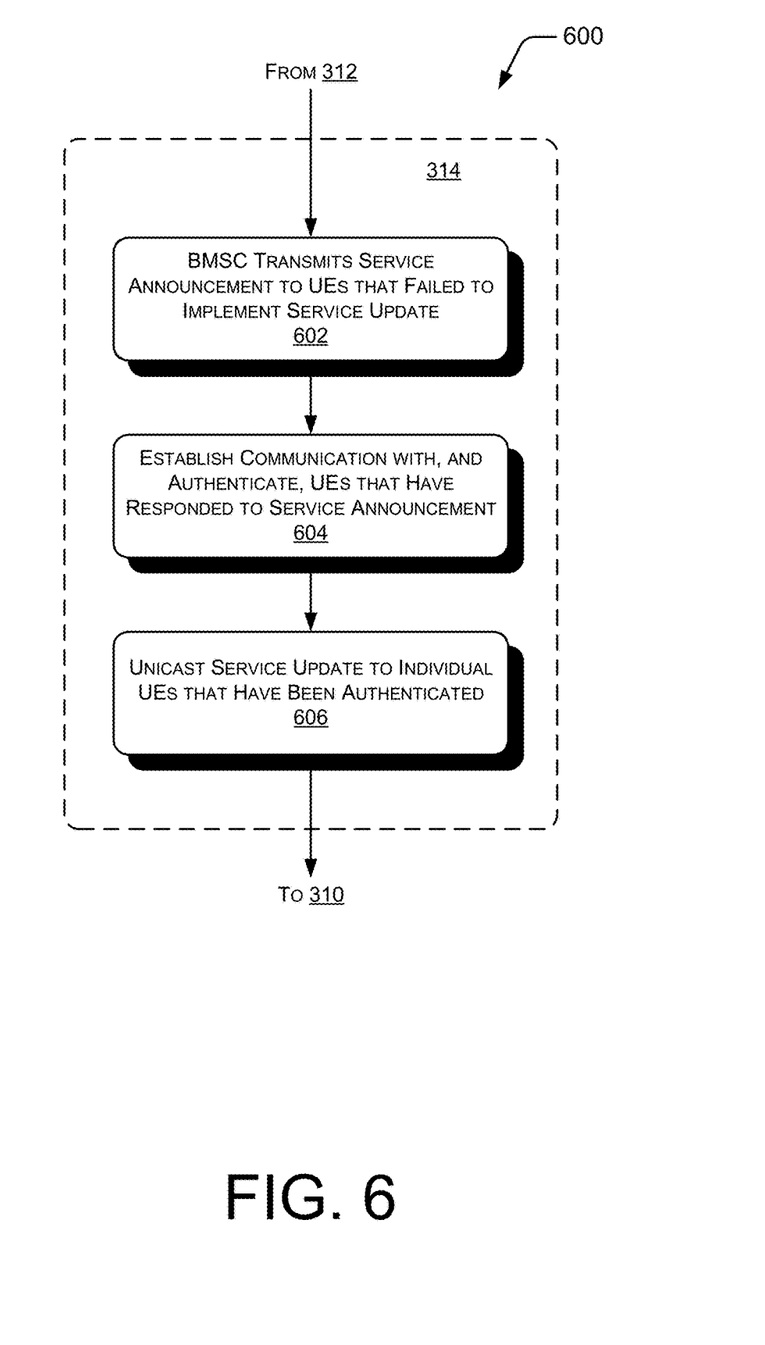
FIG. 6 illustrates a third example process detailing the block of FIG. 3 for providing the service update to the UEs that failed to successfully implement the service update.

FIG. 6 illustrates a third example process 600 detailing block 314 of FIG. 3 for providing the service update to the UEs that failed to successfully implement the service update.

In block 602, the server 114 may cause the BMSC 112 to transmit another service announcement to those UEs identified to have failed to successfully implement the service update in block 312. In block 604, the server 114 may establish communication with, and authenticate, the UEs that have responded to the other service announcement, and, in block 606, may unicast the service update individually to the UEs which the server 114 has authenticated. The unicasting of the service update may be scheduled at one or more predetermined time slots or at randomly scheduled time slots, and may include various types of contents, such as the same service update, a portion of the service update, or file repair instructions, based on the type of failure indicated in the report for the UE receiving the unicast. The process may then go back to block 310 where the implementation status reports from the UEs are received, and the process may be repeated for a predetermined number of times.

Figure 7:
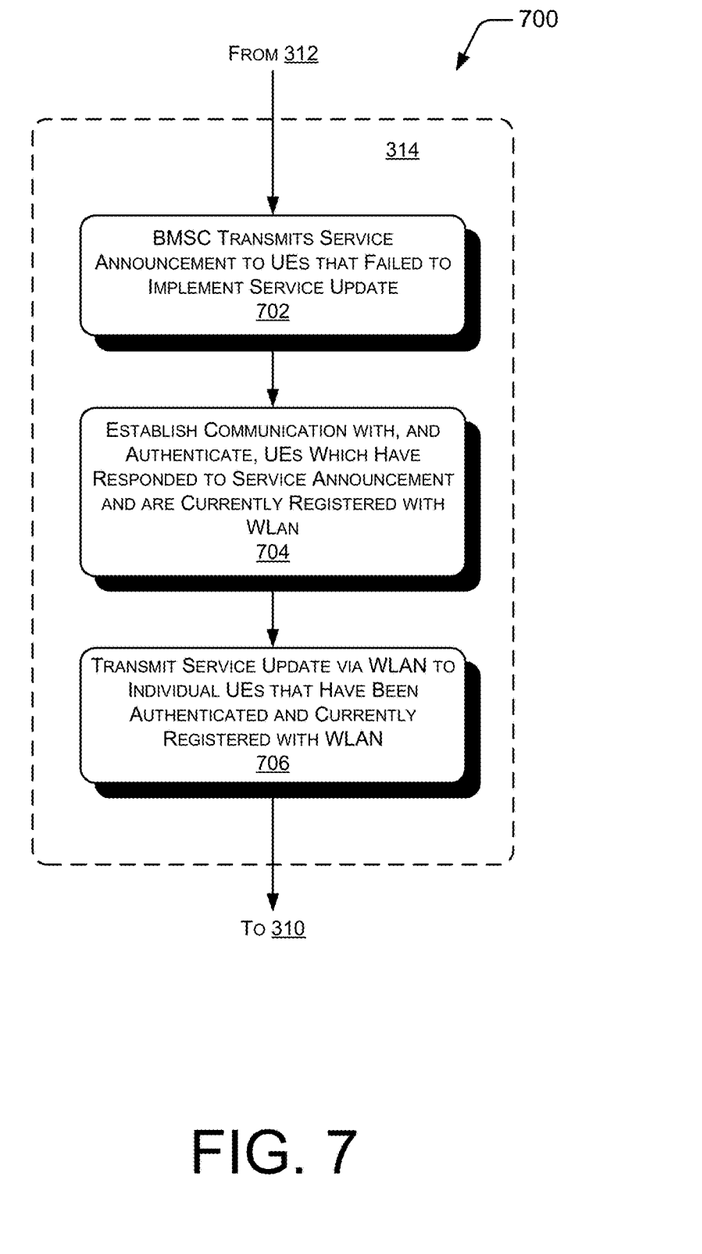
FIG. 7 illustrates a fourth example process detailing the block of FIG. 3 for providing the service update to the UEs that failed to successfully implement the service update.

FIG. 7 illustrates a fourth example process 700 detailing block 314 of FIG. 3 for providing the service update to the UEs that failed to successfully implement the service update.

In block 702, the server 114 may cause the BMSC 112 to transmit another service announcement to those UEs identified in block 312 to have failed to successfully implement the service update. In block 704, the server 114 may establish communication with, and authenticate, the UEs which have responded to the other service announcement and are currently registered with a WLAN, such as the WLAN 116 as illustrated in FIG. 1. In block 706, the server 114, which may be communicatively coupled to the WLAN 116 via Internet 120, may then transmit the service update via the WLAN 116 to the UEs, such as the UE 102(2) and UE118, that have authenticated by the server 114 and are currently registered with the WLAN 116. The transmission of the service update may include various types of contents, such as the same service update, a portion of the service update, or file repair instructions, based on the type of failure indicated in the report for the UE. The process may then go back to block 310 where the implementation status reports from the UEs are received, and the process may be repeated for a predetermined number of times.

Figure 8:
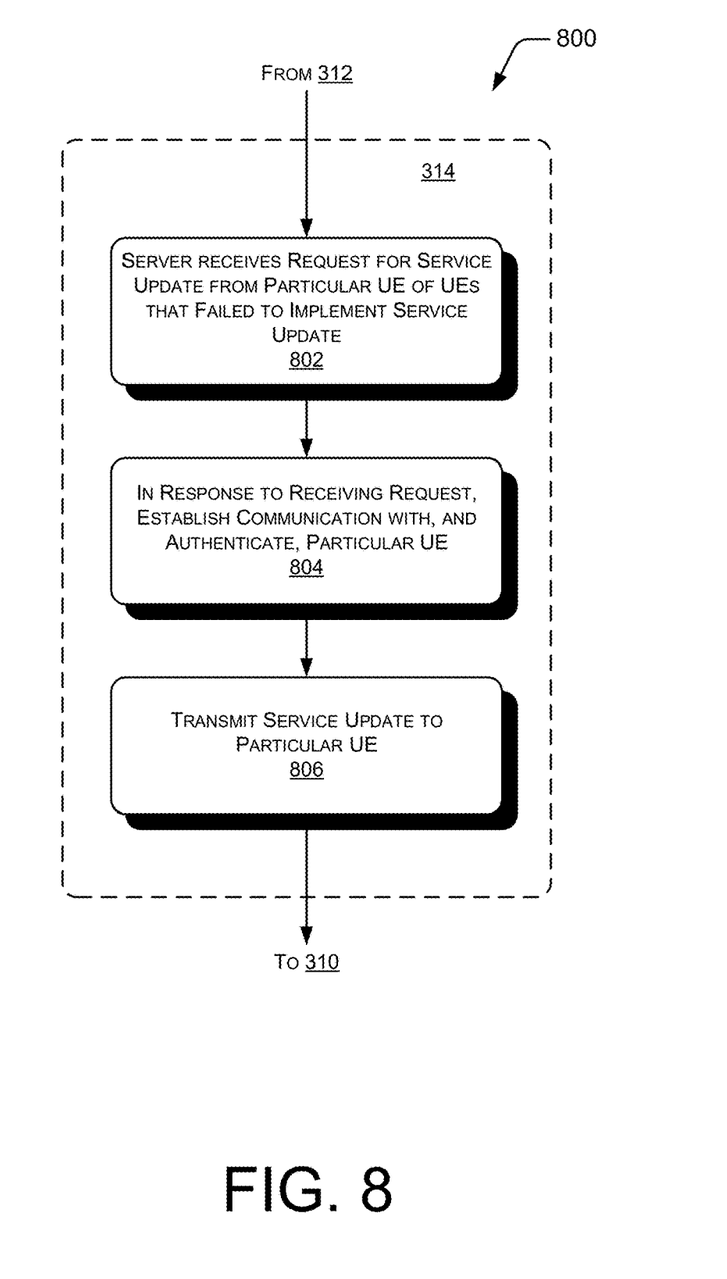
FIG. 8 illustrates a fifth example process detailing the block of FIG. 3 for providing the service update to the UEs that failed to successfully implement the service update.

FIG. 8 illustrates a fifth example process 800 detailing block 314 of FIG. 3 for providing the service update to the UEs that failed to successfully implement the service update.

In block 802, the server 114 may receive a request for the service update from a particular UE, such as the UE 102, of the UEs identified in block 312 to have failed to successfully implement the service update. In block 804, the server 114 may establish communication with, and authenticate, the UE 102 in response to receiving the request. The server 114 may then transmit, or allow the UE 102 to download, the service update via unicasting or a WLAN such as the WLAN 116 in block 806. The transmission/download of the service update may include various types of contents, such as the same service update, a portion of the service update, or file repair instructions, based on the type of failure indicated in the report for the UE 102. The unicasting may be scheduled at one or more predetermined time slots or at randomly scheduled time slots. The process may then go back to block 310 where the implementation status report from the UE 102 is received, and the process may be repeated for a predetermined number of times.

Figure 9:
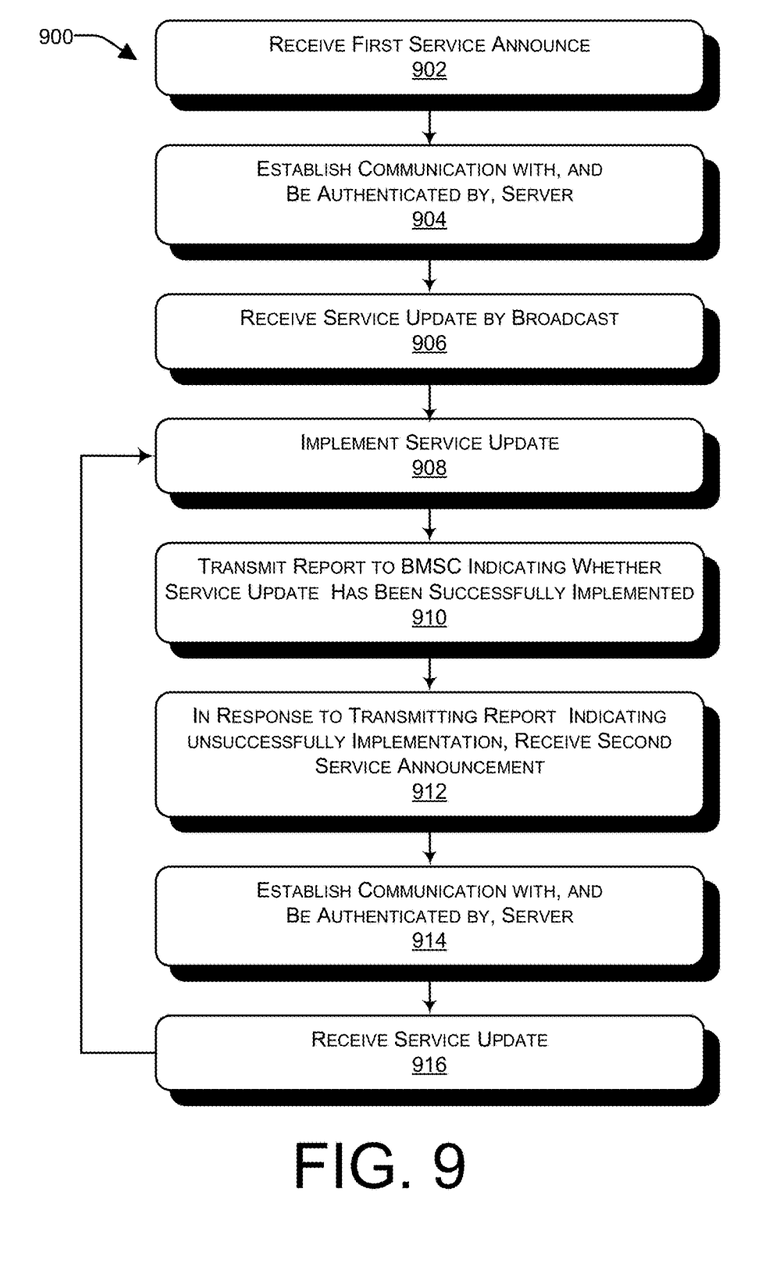
FIG. 9 illustrates an example process for the UE to receiving a service update for an installed service.

FIG. 9 illustrates an example process 900 for the UE 102 to receiving a service update for an installed service.

At block 902, the UE 102 may receive a first service announcement from the BMSC 112 regarding the service update availability. The UE 102 may receive the first service announcement in a broadcast from the BMSC 112 and may additionally receive periodic repeated announcements, for example once a day for a week following the first announcement. The UE 102 may also discover the service update availability upon sending an inquiry, for example, each time the UE is powered up. The service announcements may include a scheduled broadcast time for the service update, for example, during off-peak hours or a maintenance window. In response to receiving the first service announcement, the UE 102, in block 904, may establish communication with, and be authenticated by, the server 114, which is communicatively coupled to the BMSC 112. The UE 102 may then receive the service update as a broadcast message, targeted for all UEs compatible with the service update within the broadcast coverage area 108, from the base station 110 at block 906. As illustrated and discussed with reference to FIG. 1 above, the base station 110 may be communicatively coupled to the BMSC 112 and the server 114. A dedicated broadcasting channel or spectrum may be used for broadcasting the service update to the UEs including the UE 102.

At block 908, the UE 102 may implement the received service update and determine whether the implementation has been successful. The UE 102 may fail to successfully implement the service update due to various conditions such as missing the service update broadcast, receiving the service update but failing to successfully implement the received service update, getting interrupted during the service update broadcast, and receiving a corrupt service update. At block 910, the UE 102 may transmit a report to the BMSC 112, via the base station 110, notifying whether the UE 102 has successfully implemented the service update. The BMSC 112 may forward the report to the server 114. In response to transmitting a report indicating unsuccessful implementation of the service update, the UE 102 may receive a second service announcement from the BMSC 112 in block 912. In response to receiving the second service announcement, the UE 102, in block 914, may establish communication with, and be authenticated by, the server 114, and may receive the service update in block 916. Receiving the service update may include receiving various types of contents, such as the same service update, a portion of the service update, or file repair instructions, based on the type of failure indicated in the report for the UE 102. For example, the UE 102 may receive the service update via a re-broadcast from the BMSC, via a unicast from the BMSC 112, or via a WLAN with which the UE is registered such as the WLAN 116. The unicast from the BMSC 112 may be scheduled at one or more predetermined time slots or at randomly scheduled time slots. The process may then loop back to block 908 where the UE 102 implements the received service update, and the process may be repeated for a predetermined number of times.

Some or all operations of the methods described above can be performed by execution of computer-readable instructions stored on a computer storage medium, as defined below. The term "computer-readable instructions" as used in the description and claims, include routines, applications, application modules, program modules, programs, components, data structures, algorithms, and the like. Computer-readable instructions can be implemented on various system configurations, including single-processor or multi-processor systems, minicomputers, mainframe computers, personal computers, hand-held computing devices, microprocessor-based, programmable consumer electronics, combinations thereof, and the like.

The computer storage media may include volatile memory (such as random access memory (RAM)) and/or non-volatile memory (such as read-only memory (ROM), flash memory, etc.). The computer storage media may also include additional removable storage and/or non-removable storage including, but not limited to, flash memory, magnetic storage, optical storage, and/or tape storage that may provide non-volatile storage of computer-readable instructions, data structures, program modules, and the like.

The computer storage medium is an example of computer-readable media. Computer-readable media includes at least two types of computer-readable media, namely computer storage media and communications media. Computer storage media includes volatile and non-volatile, removable and non-removable media implemented in any process or technology for storage of information such as computer-readable instructions, data structures, program modules, or other data. Computer storage media includes, but is not limited to, phase change memory (PRAM), static random-access memory (SRAM), dynamic random-access memory (DRAM), other types of random-access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanism. As defined herein, computer storage media do not include communication media.

The computer-readable instructions stored on one or more computer storage media that, when executed by one or more processors, perform operations described above with reference to FIGS. 2-9. Generally, computer-readable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the processes.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. A method for simultaneously updating an installed service for multiple user equipment (UEs), the method comprising:
   receiving a service update by a broadcast multicast service center (BMSC) from a server;
   transmitting a service announcement from the BMSC to a plurality of UEs, the service announcement including a notice of service update availability;
   establishing, via the server, communication with, and authenticating, a group of UEs, the group of UEs being a subset of the plurality of UEs and compatible with the service update;
   transmitting the service update from the BMSC to the group of UEs, the transmitting including broadcasting, by a base station receiving the service update from the BMSC, the service update to a first part of the group of UEs that responded to the service announcement and transmitting, via the server, the service update via a wireless local area network (WLAN) to a second part of the group of UEs that did not respond to the service announcement;
   receiving, by the BMSC, a report from each UE of the group of UEs, the report indicating whether a UE associated with the report has successfully implemented the service update;
   identifying, as identified UEs, UEs that have failed to implement the service update based on the reports; and
   providing the service update to the identified UEs.

2. A method of claim 1, wherein providing the service update to the identified UEs comprises:
   determining that a number of the identified UEs is greater than a predetermined number of UEs that have failed to implement the service update;
   transmitting another service announcement from the BMSC to the identified UEs;
   establishing communication with, and authenticating, UEs of the identified UEs that have responded to the other service announcement; and
   re-broadcasting the service update from the BMSC to the UEs of the identified UEs that have been authenticated.

3. A method of claim 1, wherein providing the service update to the identified UEs comprises:
   identifying, as identified regional UEs, regional UEs that have failed to implement the service update within a geographical region based on the reports;
   sending another service announcement from the BMSC to the identified regional UEs;
   establishing communication with, and authenticating, UEs of the identified regional UEs that have responded to the other service announcement; and
   re-broadcasting the service update from the BMSC to the UEs of the identified regional UEs that have been authenticated.

4. A method of claim 1, wherein providing the service update to the identified UEs comprises:
   transmitting another service announcement from the BMSC to the identified UEs;
   establishing communication with, and authenticating, a UE of the identified UEs that has responded to the other service announcement; and unicasting the service update to the UE of the identified UEs.

5. A method of claim 1, wherein providing the service update to the identified UEs comprises:
   transmitting another service announcement from the BMSC to the identified UEs;
   establishing communication with, and authenticating, a UE of the identified UEs that has responded to the other service announcement; and
   transmitting the service update to the UE of the identified UEs via the WLAN.

6. A method of claim 1, wherein providing the service update to the identified UEs comprises:
   receiving a request for the service update from a particular UE of the identified UEs;
   in response to receiving the request, establishing communication with, and authenticating, the particular UE; and
   transmitting the service update to the particular UE of the identified UEs.

7. A method of claim 1, wherein broadcasting the service update to the first part of the group of UEs comprises:
   broadcasting the service update using a dedicated broadcasting channel.

8. A method of claim 1, wherein the UEs that have failed to implement the service update include UEs that have:
   failed to receive the service update,
   failed to successfully implement a received service update,
   received a corrupt service update, or
   received an incomplete service update.

9. A system for simultaneously updating an installed service for multiple user equipment (UEs) comprising:
   one or more processors; and
   a computer storage medium coupled to the one or more processors, the computer storage medium storing computer-readable instructions by the one or more processors, that when executed, cause the one or more processors to perform operations comprising:
   receiving a service update by a broadcast multicast service center (BMSC) from a server;
   transmitting a service announcement from the BMSC to a plurality of UEs, the service announcement including a notice of service update availability;
   establishing, via the server, communication with, and authenticating, a group of UEs responding to the service announcement, the group of UEs being a subset of the plurality of UEs and compatible with the service update;
   broadcasting the service update from the BMSC to a first part of the group of UEs that responded to the service announcement;
   transmitting, via the server, the service update to a second part of the group of UEs that did not respond to the service announcement;
   receiving, by the BMSC, a report from each UE of the group of UEs, the report indicating whether a UE associated with the report has successfully implemented the service update;
   identifying, as identified UEs, UEs that have failed to implement the service update based on the reports; and
   providing the service update to the identified UEs, wherein the providing includes performing one of re-broadcasting the service update, multicasting the service update, unicasting the service update, or transmitting the service update via a wireless local area network (WLAN) to a first part of the identified UEs and performing a different one of the re-broadcasting, the multicasting, the unicasting, or the transmitting to a second part of the identified UEs.

10. A system of claim 9, wherein providing the service update to the identified UEs comprises:
    determining that a number of the identified UEs is greater than a predetermined number of UEs that have failed to implement the service update;
    transmitting another service announcement from the BMSC to the identified UEs;
    establishing communication with, and authenticating, UEs of the identified UEs that have responded to the other service announcement; and
    re-broadcasting the service update from the BMSC to the UEs of the identified UEs that have been authenticated.

11. A system of claim 9, wherein providing the service update to the identified UEs comprises:
    identifying, as identified regional UEs, regional UEs that have failed to implement the service update within a geographical region based on the reports;
    sending another service announcement from the BMSC to the identified regional UEs;
    establishing communication with, and authenticating, UEs of the identified regional UEs that have responded to the other service announcement; and
    re-broadcasting the service update from the BMSC to the UEs of the identified regional UEs that have been authenticated.

12. A system of claim 9, wherein providing the service update to the identified UEs comprises:
    transmitting another service announcement from the BMSC to the identified UEs;
    establishing communication with, and authenticating, a UE of the identified UEs that has responded to the other service announcement; and
    unicasting the service update to the UE of the identified UEs.

13. A system of claim 9, wherein providing the service update to the identified UEs comprises:
    transmitting another service announcement from the BMSC to the identified UEs;
    establishing communication with, and authenticating, a UE of the identified UEs that has responded to the other service announcement; and
    transmitting the service update to the UE of the identified UEs via a WLAN with which the UE of the identified UEs is registered.

14. A system of claim 9, wherein providing the service update to the identified UEs comprises:
    receiving a request for the service update from a particular UE of the identified UEs;
    in response to receiving the request, establishing communication with, and authenticating, the particular UE of the identified UEs; and
    transmitting the service update to the UE of the identified UEs.

15. A system of claim 9, wherein broadcasting the service update from the BMSC to the group of UEs comprises:
    broadcasting the service update using a dedicated broadcasting channel.

16. A system of claim 9, wherein the UEs that have failed to implement the service update include UEs that have:
   failed to receive the service update,
   failed to successfully implement a received service update,
   received a corrupt service update, or
   received an incomplete service update.

\* \* \* \* \*